United States Patent Office 3,202,504
Patented Aug. 24, 1965

3,202,504
PROCESS FOR REFINING AND IMPROVING THE QUALITY OF STEEL AND OTHER FERROUS METALS
Heber J. Hamlet, 6915 SE. 66th Ave., and Loyal H. McCarthy, 809 American Bank Bldg., both of Portland, Oreg.
No Drawing. Filed Aug. 7, 1961, Ser. No. 129,531
7 Claims. (Cl. 75—53)

Our discovery and invention relates particularly to the production of a quality of slag during the melting of the metal in the furnace which is somewhat similar but is much less expensive and has advantages other than those set forth in the recent United States Patent No. 2,992,096 just issued to Heber J. Hamlet, one of the joint inventors of the present discovery and invention.

Our present discovery and invention also relates to a still greater freedom from impurities, flaws and undesirable inclusions, thereby producing a product with the same high degree of tensile strength and a somewhat improved consistency of the grain of the product over that obtained with the previous process.

We have discovered that by the use of our slag conditioner, as set forth in our specification, the walls of the furnace take on a better surface glazing which retards eating away or disintegrating the brick of the furnace walls and the material between said bricks, especially noticeable along the slag line.

The quantity of our slag conditioner as set forth in our specification and claims is as indicated after our improved slag conditioner has been used in the furnace for several heats, and the results are more beneficial after several heats have been run in accordance with the directions in the specification.

By reason of this purifying quality in our process there is no danger of the furnace operator damaging a heat by using a larger quantity of our slag conditioner than that set forth in our specification and claims.

Our new discovery and invention possesses the advantages set forth in United States Patent No. 2,992,096, previously referred to, enabling the operator of the furnace to determine by the condition and texture of the slag forming on top of the molten metal while in the furnace to serve as an index to guide the operator in the use of any further alloys or additives, including our improved slag conditioner, to produce a desired character and quality of steel or other ferrous metal which is being produced.

Our slag conditioner consists essentially of lava rock preferably crushed or broken into particles or parts of such size as may most conveniently be used in connection with the melting process, gauged in sizing by screen 10 and larger having been found desirable.

In making steel or other ferrous metals where our method and process have been followed, when our slag conditioner is used either with or without other additives or alloys, it has been found that the steel and other ferrous metal so manufactured has a finer and more consistent grain, higher tensile strength, greater freedom from impurities, flaws and undesirable inclusions, and is better adapted to hardening than when made without the application of our slag conditioner.

In the claims hereinafter set forth we have indicated a preferred quantity of our slag conditioner for use during the melting process. While the quantity indicated should produce the desired quality of steel, the scrap metal used for making steel may vary in the metal and chemical content to such an extent as to vary the slag formed during the melting process.

The man in charge of the furnace is accustomed to examine the slag formed in the furnace to indicate whether or not further additives are required for producing the character and quality of steel or metal desired, and one of the greatest advantages in connection with our method and process resides in the fact that use of more of the slag conditioner than that indicated in our claims will in no way injure the steel or metal which is being produced.

Our process and method used in connection with the melting of all kinds of metals from crude, impure iron, pigs or ingots, including all classes of scrap iron regardless of other metals which may have been used in the manufacture of scrap iron, involves the following steps.

First: Charge the furnace with enough of the metal being melted to entirely cover the floor of the furnace.

Second: Place on top of the metal then in the furnace, for each square foot of area in the plane of the slag line, one and one-third pounds of our slag conditioner.

Third: Charge the furnace with the remainder of the metal to be melted.

Fourth: Melt the metal to a flux or fluid state and then charge the furnace on top of the melted metal with two-thirds of a pound of our improved slag conditioner for each square foot of area in the plane of the slag line.

Fifth: Follow the regular method and process of adding other alloys in common use for producing a metal of the desired characteristics and quality in the final product, the same as would be done if our improved slag conditioner were not used.

By using our slag conditioner in the foregoing process the manufactured metal produced will have a much finer grain and be better adapted to hardening than that made without the application of our lava rock conditioner.

We claim:

1. A method for manufacturing steel and other ferrous metals, consisting of (1) charging the furnace with enough of the metal being melted to entirely cover the floor of the furnace; (2) placing on top of the metal then in the furnace, for each square foot of area in the plane of the slag line, one and one-third pounds of lava alone; (3) charging the furnace with the remainder of the metal to be melted; (4) melting the metal to a flux or fluid state and then charging the furnace on top of the melted metal with two-thirds of a pound of lava alone for each square foot of area in the plane of the slag line; (5) adding alloying elements for producing a metal of the desired characteristics and quality in the final product.

2. A method of manufacturing steel and other ferrous metals in which additives are used during the melting process consisting of (1) charging the furnace with enough of the metal being melted to entirely cover the floor of the furnace; (2) placing on top of the metal then in the furnace, for each square foot of area in the plane of the slag line, one and one-third pounds of lava alone; (3) charging the furnace with the remainder of the metal to be melted; (4) melting the metal to a flux or fluid state and then charging the furnace on top of the melted metal with two-thirds of a pound of lava alone for each square foot of area in the plane of the slag line; (5) adding alloying elements for producing a metal of the desired characteristics and quality in the final product.

3. A method of maintaining the walls of a metal melting furnace where slag is required, consisting of adding during the melting process two pounds of particles of lava alone for each square foot of area in the plane of the slag line of said furnace.

4. A method for maintaining the walls of a metal melting furnace in which slag is required, consisting of adding during the melting process two pounds of lava alone for each square foot of area of said furnace in the plane of the slag line, said lava having been broken into any convenient particles.

5. A method for manufacturing by melting steel and other ferrous metals where slag is required, consisting of adding during the melting process two pounds of lava alone to the furnace charge for each square foot in the plane of the slag line of said furnace.

6. A method for maintaining the walls of a metal manufacturing furnace in which slag is required, consisting of adding two pounds of lava alone to each square foot of area of said furnace in the plane of the slag line, said lava being broken into any convenient particles.

7. A method for manufacturing steel and other ferrous metals where slag is required, consisting of adding two pounds of lava alone to a furnace charge for each square foot in the plane of the slag line of said furnace.

References Cited by the Examiner

UNITED STATES PATENTS

| | | | |
|---|---|---|---|
| 1,890,485 | 12/32 | Amsler | 75—53 |
| 2,992,096 | 7/61 | Hamlet | 75—53 |

BENJAMIN HENKIN, *Primary Examiner.*

MARCUS U. LYONS, *Examiner.*